US005787919A

United States Patent [19]

Pyle

[11] Patent Number: 5,787,919

[45] Date of Patent: Aug. 4, 1998

[54] PRESSURE DIFFERENTIAL INDICATOR WITH FIRE DAMPER

[75] Inventor: Robert D. Pyle, Cincinnati, Ohio

[73] Assignee: Lamiflow Air Systems, Inc., Cincinnati, Ohio

[21] Appl. No.: 761,218

[22] Filed: Dec. 6, 1996

[51] Int. Cl.$^6$ .................... F16K 17/38

[52] U.S. Cl. .................... 137/79; 73/861.75; 454/369

[58] Field of Search .................... 137/79; 73/861.75, 73/700; 116/271; 454/255, 369

[56] References Cited

U.S. PATENT DOCUMENTS

| | | | |
|---|---|---|---|
| 622,851 | 3/1899 | Hatch | 454/255 |
| 960,917 | 6/1910 | Henderson . | |
| 988,496 | 4/1911 | Obermann . | |
| 2,034,373 | 3/1936 | Bilde | 116/271 |
| 2,072,369 | 3/1937 | Jenson | 116/271 |
| 2,605,639 | 8/1952 | Gentile, Jr. . | |
| 2,647,402 | 8/1953 | Ibbott . | |
| 3,282,103 | 11/1966 | Steele . | |
| 3,463,003 | 8/1969 | Pierman et al. . | |
| 3,564,917 | 2/1971 | Cronin et al. . | |
| 3,640,307 | 2/1972 | Drzala | 454/255 |
| 3,826,136 | 7/1974 | Chang . | |
| 4,084,744 | 4/1978 | Wilson, Jr. . | |
| 4,113,230 | 9/1978 | McCabe | 454/369 |
| 4,133,213 | 1/1979 | Brandt, Jr. . | |
| 4,154,101 | 5/1979 | Buchanan et al. . | |
| 4,160,380 | 7/1979 | Dunne, Jr. et al. . | |
| 4,170,899 | 10/1979 | Fujita et al. . | |
| 4,453,417 | 6/1984 | Moyers et al. . | |
| 4,454,765 | 6/1984 | Lodge . | |
| 4,467,824 | 8/1984 | Strulik et al. . | |
| 4,480,467 | 11/1984 | Harter et al. . | |
| 4,625,626 | 12/1986 | Aalto et al. . | |
| 4,958,687 | 9/1990 | Nakagawa . | |
| 5,444,947 | 8/1995 | Miller . | |
| 5,533,929 | 7/1996 | Attridge, Jr. | 137/79 |
| 5,589,643 | 12/1996 | Pyle | 73/861.75 |

FOREIGN PATENT DOCUMENTS

| | | | |
|---|---|---|---|
| 554715 | 6/1923 | France | 73/861.75 |
| 1222797 | 6/1960 | France . | |
| 447638 | 3/1968 | Switzerland | 73/861.75 |

*Primary Examiner*—Denise L. Perensic
*Assistant Examiner*—John Ball
*Attorney, Agent, or Firm*—Steven J. Rosen

[57] ABSTRACT

A pressure differential indicating apparatus has a wall duct with first and second ends, first and second flange like mounting plates respectively disposed around and attached to the first and second ends, a low speed airflow indicator mounted at one of the ends on a side of the mounting plate opposite that to which the wall duct is mounted, and a fire damper with a closable fire damping door that is disposed in the duct. The fire damper includes an actuation device for keeping the door open until the actuation device is caused to close the door. One particular embodiment of the actuation apparatus has a spring counter loaded solenoid that keeps the door open when energized and a spring operably connected to the solenoid so as to close the door when the solenoid is de-energized. An alarm system may be used for detecting smoke/fire and controlling a voltage supply line connected to the solenoid may be used to energize the solenoid and includes power cutoff apparatus for cutting off voltage to the supply line to de-energize the solenoid and close the fire damping door that is disposed in the duct.

15 Claims, 5 Drawing Sheets

PRESSURE DIFFERENTIAL INDICATOR WITH FIRE DAMPER

BACKGROUND OF THE INVENTION

1. Field of the Invention

This invention relates to pressure differential indicators and, more particularly, to such pressure differential indicators that use low airflow rate indicators to indicate and allow monitoring of pressure differentials across walls and have fire dampers positioned within the ducts of pressure differential indicators to close fire dampening doors in the ducts when a smoke/fire alarm is set off.

2. Description of Related Art

Some specific spaces or rooms such as at a hospital require a proper negative pressure in the interior space or room in order to prevent germs or virus dissipating through a fissure by airflow to an exterior space outside the room such as an exterior room, hallway or corridor. The interior air pressure is lower than that at the exterior because airflow travels from a space of higher pressure to a space of lower pressure. It is well known to provide a device that keeps the interior air pressure lower than that of the exterior in order to maintain a clean and healthy environment, such a system is described in U.S. Pat. No. 5,228,306. It is necessary for the doctors, nurses, and other concerned employees and individuals to easily monitor whether or not a proper vacuum (a negative pressure differential) is being maintained in a room from outside the room such as in the hallway or corridor. Fairly sophisticated devices, usually electronically controlled, have been developed for this purpose. However, these devices are expensive to procure and maintain and subject to failure. Furthermore, because the pressure differential across such walls, particularly hospital walls, is very small, present day devices are expensive and difficult to maintain and calibrate.

A pressure differential indicating apparatus was developed by the present inventor, which incorporates a preferably adjustable airflow duct across the wall between the low and high pressure spaces and a low airflow indicator on the side of the wall opposite the space, that is to be monitored to indicate air pressure differentials and particularly low pressure differentials across walls. This apparatus is disclosed in co-pending U.S. Pat. No. 5,589,643 which issued Dec. 31, 1996 and which is incorporated herein by reference.

Low air velocity gauges for measuring low airflow rates are well known in the art. One conventional air velocity measuring device uses a hot wire anemometer, which requires electrical power to operate and is expensive. A relatively less expensive mechanical device in the prior art, a rotational vane type that has a number of intricate moving parts that require maintenance, is still relatively expensive and is not easy to monitor by a person walking down a hospital hall. A low air velocity gauge is disclosed in U.S. Pat. No. 4,154,101 to provide a low cost velocity gauge of simplified and trouble free nature that reliably measures air velocity or draft movement in the low airflow 20–400 feet per minute rate range.

When the pressure differential indicating apparatus referenced in the above co-pending U.S. Pat. No. 5,589,643 is placed in a fire rated wall, such as found in many hospitals and other buildings, it too must be fire rated. This invention is directed to providing such a device that can be used across a fire rated wall.

SUMMARY OF THE INVENTION

The present invention is a pressure differential indicating apparatus having a wall duct with first and second ends, first and second flange like mounting plates respectively, disposed around and attached to the first and second ends, a low speed airflow indicator mounted at one of the ends on a side of the mounting plate opposite that to which the wall duct is mounted, and a fire damper with a closable fire damping door that is disposed in the duct.

The fire damper includes an actuation means for keeping the door open until the actuation means is caused to close the door. The actuation means may have a spring counter loaded solenoid that keeps the door open when energized and a spring operably connected to the solenoid so as to close the door when the solenoid is de-energized. An alarm means for detecting smoke/fire and controlling a voltage supply line connected to the solenoid may be used to energize the solenoid. The alarm means further includes a power cutoff means for cutting off voltage to the supply line to de-energize the solenoid.

The low speed airflow indicator is adapted to indicate a specified pressure differential or range of pressure differential across a wall. The wall duct is preferably an adjustable length wall duct having two sections, a first section attached to the first mounting plate and a second section attached to the second mounting plate, wherein one of the two sections is constructed so as to be slidingly disposed in and in sealing engagement with the other of the two sections. The airflow indicator includes inlet and outlet ports, each of which is disposed through one of opposite end walls of a housing of the airflow indicator, one of the end walls abuts or is close to one of the mounting plates, and a first cross-sectional area of the wall duct is substantially greater than a second cross-sectional area of the port in the end wall that is adjacent to one of the mounting plates. The airflow indicator includes a housing having wall portions defining a planar draft way extending therethrough and a draft inlet port thereto and a draft outlet port therefrom that are aligned with the plane of and approximate the size of the way. An elongate vane is pivotably suspended pendulum fashion from an upper portion of the housing adjacent to the inlet port and disposed transversely of the draft way plane such that the vane is pivotally mounted adjacent its upper end for free swinging movement between an at rest vertically disposed position for zero airflow through the way to an inclined position angled in the direction of airflow through the way on airflow being induced through the way. The vane is proportioned to substantially partition off the way when the vane is in its at rest position and the vane preferably is a length of stripping of film thickness dimensions. The strip may have indentation means extending longitudinally thereof for holding the strip against flexure. The airflow indicator may be mounted within an extension of a clear plastic form of the duct. The extension extending past the mounting plate on the side of the wall on which the indicator is disposed.

ADVANTAGES

Among the advantages provided by the present invention is an inexpensive, low maintenance, easy to build wall mounted pressure differential indicator that can indicate a low pressure differential across a fire rated wall. Other advantages of the present invention includes; it uses no electricity to indicate pressure differentials, it can easily be installed in existing walls, and it is adjustable so that it provides the proverbial advantage of “one size fits all”. It has the advantage of being easily connected to new or existing manual or automated smoke/fire detection systems that are widely used around the world.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
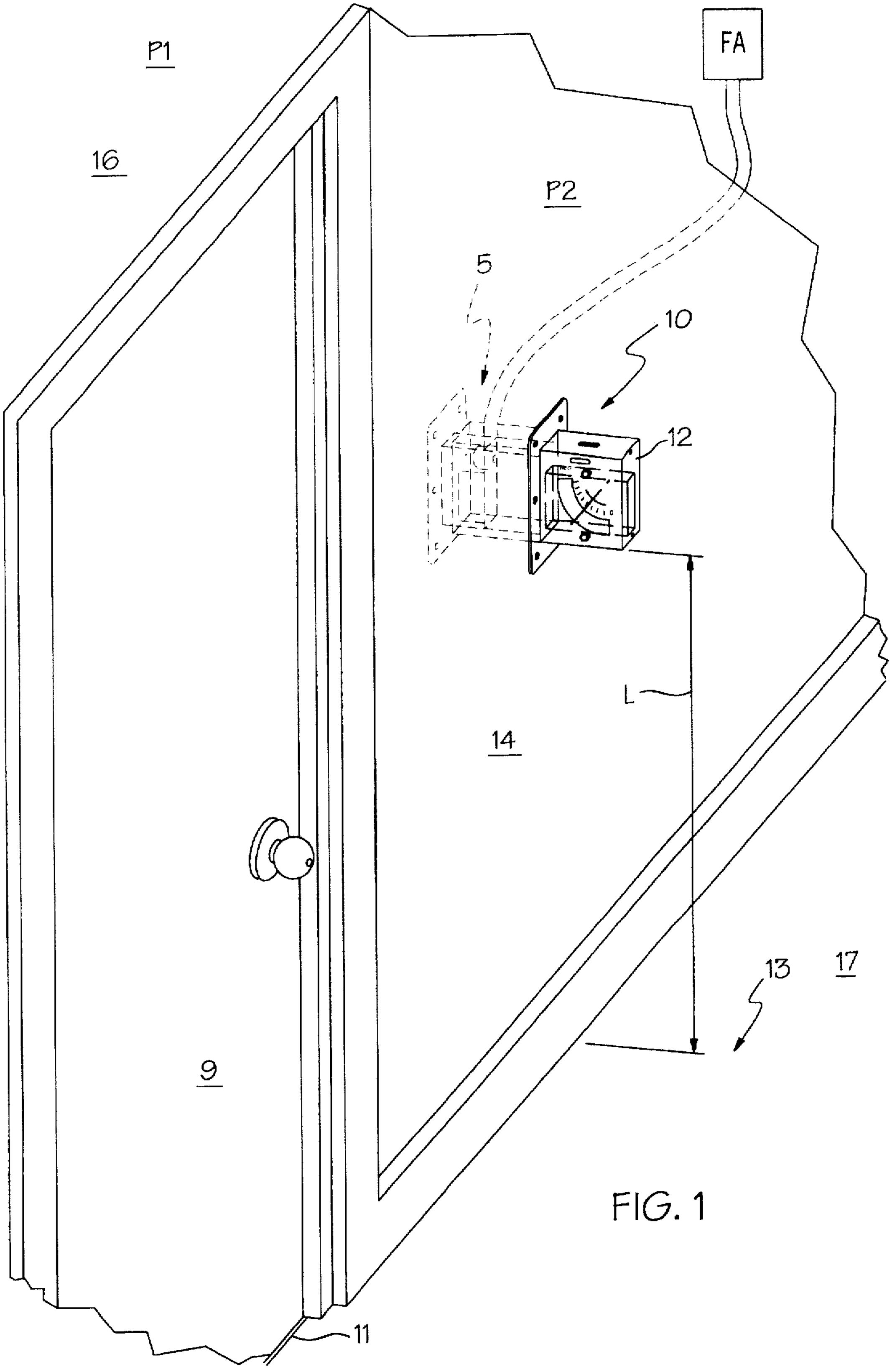
FIG. 1 is a perspective view of a room and a pressure differential indicator with fire damper in accordance with an exemplary embodiment of the present invention mounted on the wall.

Illustrated in FIG. 1 is an exemplary embodiment of the present invention, a pressure differential indicating apparatus 10 having a low speed airflow indicator 12 adapted to indicate a pressure differential across a wall 14 of a room 16. The pressure differential indicating apparatus 10 is operably mounted so that the indicator 12 is positioned on the wall 14 outside of the room 16 at an easily observable level L (eye level or other) above the floor 13 of the corridor 17. The room 16 is typical of one often found in a hospital which requires a proper negative pressure in the interior space or room 16 in order to prevent germs or virus dissipating through a fissure 11 such as may be found under a room door 9 by airflow to an exterior space outside the room such as an exterior room, hallway, or corridor 17. The interior air pressure indicated by P1 is lower than that of the exterior air pressure P2 because airflow travels from a space of higher pressure to a space of lower pressure.

Figure 2:
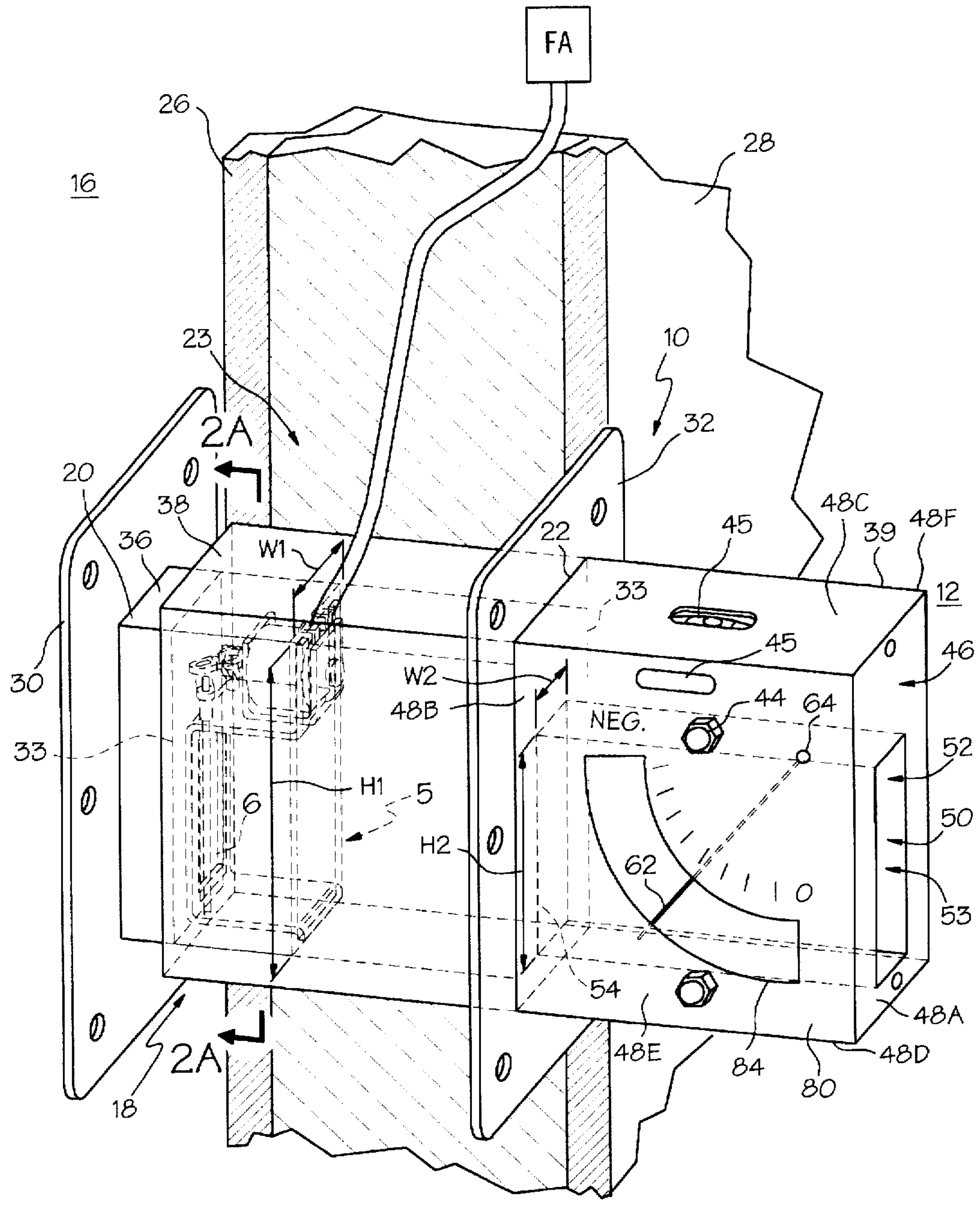
FIG. 2 is an enlarged perspective view of the pressure differential indicator and fire damper illustrated in FIG. 1.
Figure 2A:
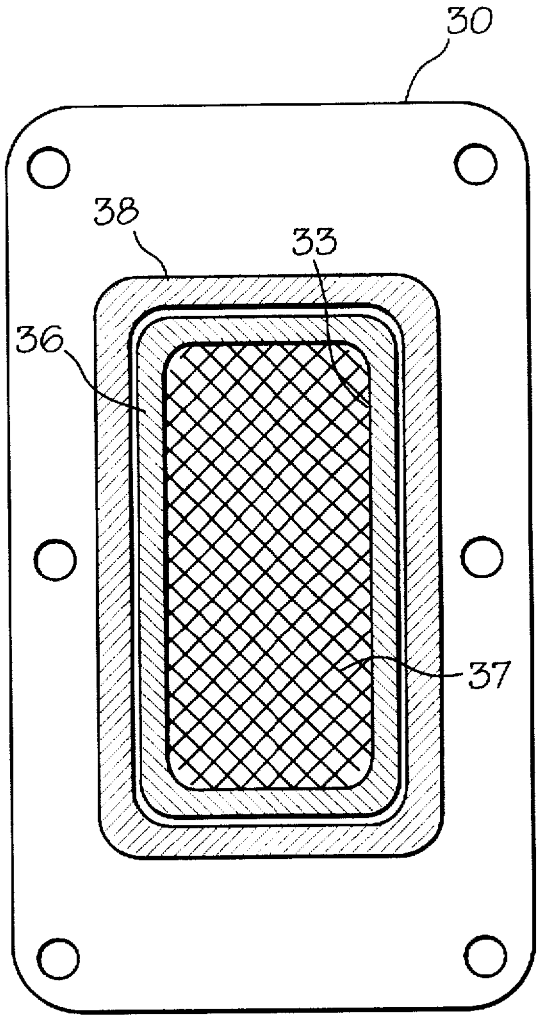
FIG. 2A is a frontal view along 2A—2A of a mounting plate of the apparatus in FIG. 2.
Figure 3:
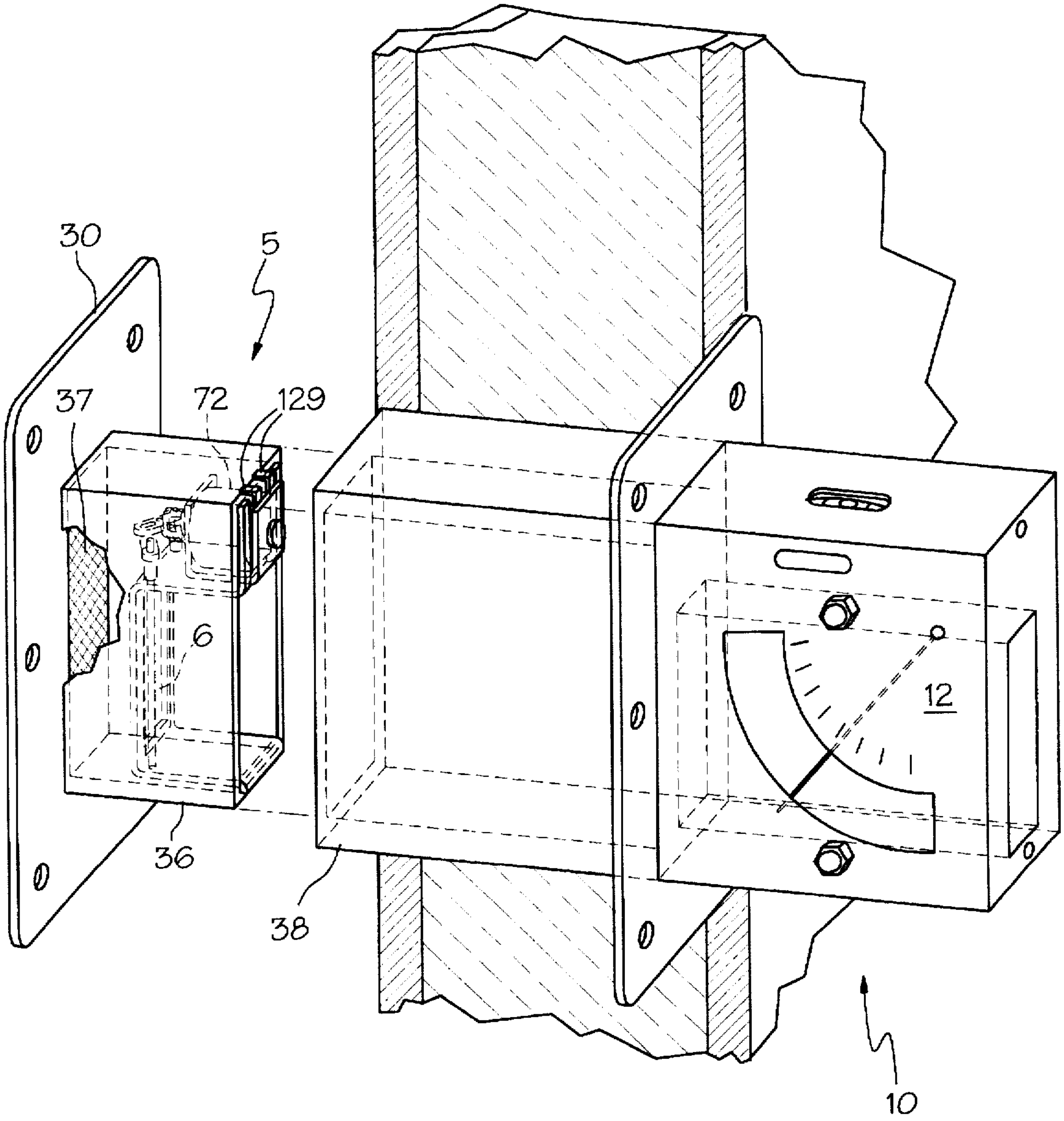
FIG. 3 is partially exploded perspective view of the pressure differential indicator and fire damper illustrated in FIG. 2.

Referring now to FIG. 2, the pressure differential indicating apparatus 10 includes a wall duct 18 to which the low speed airflow indicator 12 mounted in operable fluid communication such that all airflow passing through the wall duct also passes through the indicator. A fire damper 5 with a closable fire damping door 6 is disposed in the wall duct 18 and controlled by smoke/fire alarm system FA so as to close the fire damping door when the alarm system detects smoke and/or fire. The wall duct 18 has first and second open ends 20 and 22, respectively, which are correspondingly disposed through a hole 23 which extends through the wall 14. Flange like first and second mounting plates 30 and 32, respectively, having apertures 33 are connected to the first and second open ends 20 and 22 of the wall duct 18 and mounted to oppositely facing first and second sides 26 and 28, respectively, of the wall 14. The plates are attached to the ends in a flange like fashion surrounding the first and second open ends 20 and 22 such to allow unrestricted airflow to pass through the first and second open ends 20 and 22. The airflow indicator 12 is mounted on a side of the second mounting plate 32 opposite that by which the second mounting plate is mounted to the wall 14 such that all airflow passing through the wall duct 18 also passes through the indicator. Referring briefly to FIG. 2A, a screen 37 may be placed over the apertures 33 shown as the one on the room side of the wall 14, on the first open end 20.

The wall duct 18 is preferably an adjustable length wall duct having two sections, a first section 36 attached to the first mounting plate 30 and a second section 38 attached to the second mounting plate 32. One of the two sections is constructed so as to be slidingly disposed in and in sealing engagement with the other of the two sections. The exemplary embodiment illustrated in the FIGS. has the first section 36 slidingly disposed in and in sealing engagement with the second section 38. The second section 38 of the wall 14 may be made of plexiglass and include an extension 39 which extends through and a distance past the second mounting plate 32 to provide a convenient casing into which the indicator 12 may be mounted. The indicator 12 can be mounted by screws 44 or some other means of attachment to the second section 38 and the indicator 12 may include bubble levels 45 to help mount the entire apparatus and adjust the indicator parallel to the floor. The wall duct 18 provides an airway between the inside and outside of the room in order to develop a low speed airflow from the higher pressure area in the hallway outside the room to the lower pressure area inside the room.

The airflow indicator 12 includes a housing 46 having front, back, top, bottom, left, and right wall portions **48*a*–48*f*, respectively, defining a rectangular draft way 50 extending therethrough. The front wall portion 48*a* has an inlet port 52 and the back wall portion 48*b* has a draft outlet port 54 and the approximate size of the draft way 50. An elongated vane 62 is suspended pendulum fashion from an upper portion 64 of the housing 46 adjacent to the inlet port 52 and is disposed perpendicular to the left and right wall portions 48*e* and 48*f* and transversely of the draft way 50. The vane 62 is pivotally mounted adjacent its upper end for free swinging movement between an at rest vertically disposed position for zero airflow through the way to an inclined position angled in the direction of airflow, indicated by arrow 53, through the way for airflow that is induced through the way by a pressure differential across the wall 14. The vane 62** is proportioned to substantially close off the way when the vane is in its vertical at rest position and the vane, preferably, is a length of stripping of film thickness dimensions. The strip may have indentation means extending longitudinally thereof for holding the strip against flexure. Dwyer Instruments, Inc. in Indiana is a commercial vendor that can supply such an indicator, suitable for use in the present invention, and based on an Air Velocity Gauge disclosed in U.S. Pat. No. 4,154,101.

The airflow indicator 12 is mounted such that the front wall portion **48*a* and its draft outlet port 54 abuts or is close to the second mounting plate 32. A first cross-sectional area of the wall duct 18 as defined by a first width W1 and first height H1 of the rectangular wall duct is substantially greater than a second cross-sectional area of the draft outlet port 54 as defined by a second width W2 and a second height H2. This assists in providing an unrestricted area for an airflow indicative of the pressure differential across the wall to develop. Mounting the airflow indicator 12 in a clear plastic duct allows for ease of use and manufacture because the airflow indicator 12 may be reversed such that the inlet port 52 and vane 62 are positioned close to the second mounting plate 32 and its aperture 33 if one wanted the apparatus to indicate a positive pressure differential across the wall 14 as opposed to a negative pressure differential or pressure drop across the wall with respect to an observer outside the room 16**.

A face plate 80 is mounted in the housing and has an arcuate slot 84 to form a window for viewing the position of vane. The face plate 80 has markings to indicate the desired pressure drop or range. It need not be calibrated or gauged. This provides an easily read indicator for informing observers passing by that sufficient pressure drop exists across the wall and that equipment designed to maintain the pressure drop is operating.

Figure 6:
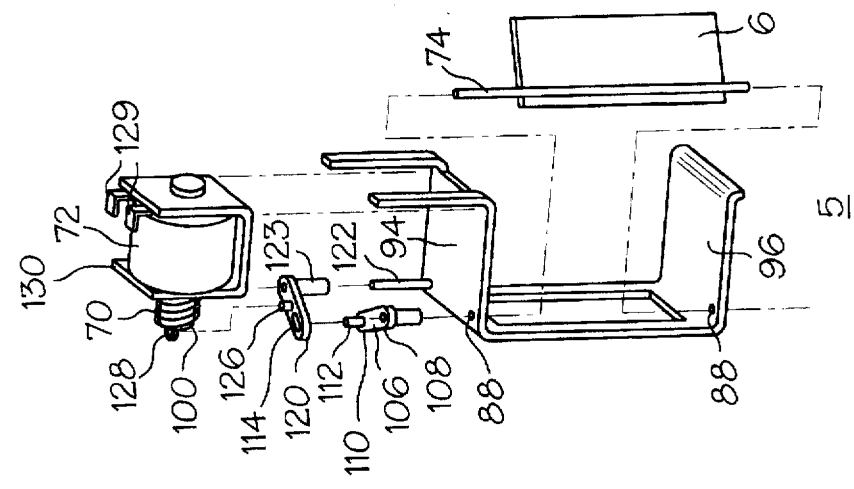
FIG. 6 is an exploded perspective view of the fire damper illustrated in FIG. 5.
Figure 5:
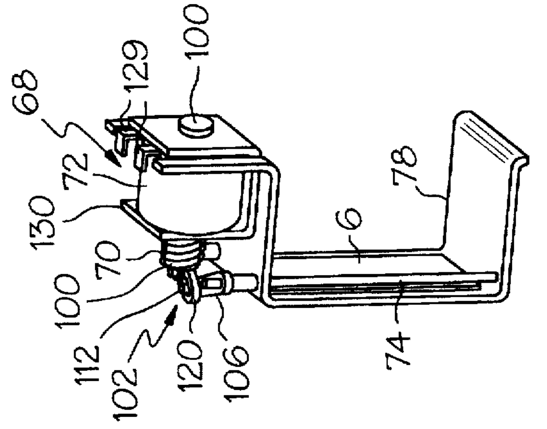
FIG. 5 is a perspective view of the fire damper illustrated in FIG. 4 with its fire damping door in a closed position.
Figure 4:
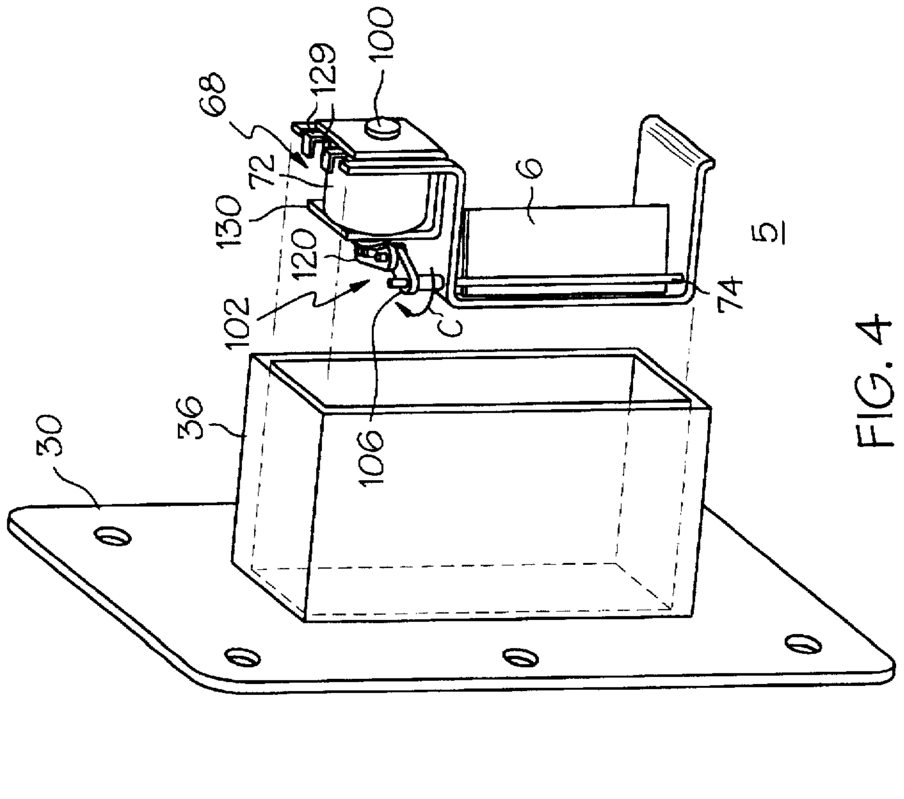
FIG. 4 is a more detailed perspective view of the fire damper illustrated in FIG. 3 with its fire damping door in an open position.

Referring now to FIGS. 4, 5 and 6, the fire damper 5 includes an actuation means 68 for keeping the damping door 6 open until the actuation means is caused to close the door by the smoke/fire alarm system FA in FIG. 1. The actuation means has a spring 70 counter loaded solenoid 72 that keeps the damping door 6 open when the solenoid is energized. The spring 70 is operably connected to the solenoid 72 so as to close the door when the solenoid is de-energized. The damping door 6 is pivotally hinged to a frame 78 of the actuation means 68 by a hinge pin 74 to which the door is fixedly attached. The pin 74 is disposed in upper and lower hinge apertures 88 at a top 94 and a bottom 96 of the frame 78. The solenoid 72 has a linearly and magnetically driven solenoid shaft 100 connected to a linkage 102 which turns the hinge pin 74 to open and close the damping door 6. The linkage 102 has a lever arm 106 fixedly mounted to the hinge pin 74 at a first end 108 of the lever arm. A second end 110 of the lever arm 106 has a guide pin 112 which is disposed in a guide slot 114 at a first end of a bar 120. A barrel 123 extends down from bar 120 at a second distal end of a bar 120 and is rotatably mounted on a post 122 on the top of the top 94 of the frame 78. About midway along the guide bar 120 is a connecting pin 126 which is rotatably disposed in a connecting aperture 128 in the solenoid shaft 100. The frame 78, fire damping door 6, and linkage 102 are all preferably constructed of a good fire resistant material such as 16 gauge steel.

The solenoid 72 is activated during normal operation by electricity supplied to it through two wires from the smoke/fire alarm system FA at two quick connect/disconnect solderless terminals 129. When the solenoid 72 is energized, the solenoid shaft 100 pulls the linkage 102 against the spring 70 which is braced against a front mount plate 130 to which the solenoid is mounted and the linkage is pulled back causing the hinge pin 74 to rotate clockwise C opening and holding the damping door 6 in the open position as shown in FIG. 4. When the smoke/fire alarm system FA is activated, it drops the power across the wires 126, thereby, de-energizing the solenoid 72 and allowing the fire damping door 6 to shut off any airflow that may pass through the wall duct 18, thus, inhibiting the transfer of both smoke and fire through the wall duct as shown in FIG. 5. When the solenoid 72 is de-energized, the spring 70 pushes against the front mount plate 130 to which the solenoid is mounted and the linkage 102 is pushed forward causing the hinge pin 74 to rotate and the fire damping door 6 to close.

While the preferred embodiment of the present invention has been described fully in order to explain its principles, it is understood that various modifications or alterations may be made to the preferred embodiment without departing from the scope of the invention as set forth in the appended claims.

What is claimed is:

1. A fire rated across the wall pressure differential indicating apparatus comprising:

a wall duct having first and second open ends, first and second mounting plates respectively attached to said wall duct at said first and second open ends respectively, a low speed airflow indicator is adapted to indicate a pressure differential and is mounted in full fluid communication with said wall duct at one of said open ends such that all airflow passing through said wall duct also passes through said indicator, and a fire damper disposed in said wall duct to prevent the transfer of smoke and fire through said wall duct.

2. An apparatus as claimed in claim 1 wherein said fire damper comprises a closable fire damping door and an actuation means for keeping said door open until said actuation means is caused to close said door.

3. An apparatus as claimed in claim 2 wherein said actuation means comprises a spring counter loaded solenoid that keeps said door open when energized and a spring which closes said door when said solenoid is de-energized.

4. An apparatus as claimed in claim 3 further comprising an alarm means for detecting smoke/fire and controlling a voltage supply line connected to said solenoid so as to energize said solenoid and power cutoff means for cutting off voltage to said supply line to de-energize said solenoid.

5. An apparatus as claimed in claim 4 wherein said wall duct is an adjustable length wall duct.

6. An apparatus as claimed in claim 5 wherein said adjustable length wall duct comprises two sections wherein a first section is attached to said first mounting plate and a second section is attached to said second mounting plate and one of said two sections is constructed so as to be slidingly disposed in and in sealing engagement with the other of said two sections.

7. An apparatus as claimed in claim 5 wherein said airflow indicator includes inlet and outlet openings each of which is disposed through one of opposite end walls of a housing of said airflow indicator, one of said end walls is attached to one of said mounting plates, and a first cross-sectional area of said wall duct is substantially greater than a second cross-sectional area of said opening in said end wall that is attached to one of said mounting plates.

8. An apparatus as claimed in claim 1 wherein said airflow indicator comprises:

a housing having wall portions defining a planar draft way extending therethrough and a draft inlet port thereto and a draft outlet port therefrom that are aligned with the plane of and approximate the size of said way, an elongate vane pivotably suspended from an upper portion of said housing adjacent to said inlet port and disposed transversely of said draft way, said vane being pivotally mounted adjacent its upper end for free swinging movement between an at rest vertically disposed position for zero airflow through said way to an inclined position angled in the direction of airflow through said way on airflow being induced through said way, and said vane being proportioned to substantially partition off said way when said vane is in its at rest position.

9. An apparatus as claimed in claim 8 wherein said fire damper comprises a closable fire damping door and an actuation means for keeping said door open until said actuation means is caused to close said door.

10. An apparatus as claimed in claim 9 wherein said actuation means comprises a spring counter loaded solenoid that keeps said door open when energized and a spring which closes said door when said solenoid is de-energized.

11. An apparatus as claimed in claim 10 further comprising an alarm means for detecting smoke/fire and controlling a voltage supply line connected to said solenoid so as to energize said solenoid and power cutoff means for cutting off voltage to said supply line to de-energize said solenoid.

12. An apparatus as claimed in claim 8 wherein said vane comprises a length of stripping of film thickness dimensions.

13. An apparatus as claimed in claim 12 wherein said length of stripping includes indentation means extending longitudinally thereof for holding same against flexure.

14. An apparatus as claimed in claim 13 wherein said wall duct is an adjustable length wall duct.

15. An apparatus as claimed in claim 14 wherein said adjustable length wall duct comprises two sections wherein a first section is attached to said first mounting plate and a second section is attached to said second mounting plate and one of said two sections is constructed so as to be slidingly disposed in and in sealing engagement with the other of said two sections.

* * * * *